US008281312B2

(12) United States Patent
Gnanasambandam et al.

(10) Patent No.: US 8,281,312 B2
(45) Date of Patent: Oct. 2, 2012

(54) SYSTEM AND METHOD PROVIDING FOR RESOURCE EXCLUSIVITY GUARANTEES IN A NETWORK OF MULTIFUNCTIONAL DEVICES WITH PREEMPTIVE SCHEDULING CAPABILITIES

(75) Inventors: Shanmuga-nathan Gnanasambandam, Webster, NY (US); Wendell Lewis Kibler, Ontario, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 582 days.

(21) Appl. No.: 12/467,690

(22) Filed: May 18, 2009

(65) Prior Publication Data

US 2010/0293550 A1 Nov. 18, 2010

(51) Int. Cl.
*G06F 9/46* (2006.01)
(52) U.S. Cl. .......... 718/104; 718/102; 718/103; 710/22
(58) Field of Classification Search ............... 718/102, 718/103, 104; 710/22
See application file for complete search history.

(56) References Cited

U.S. PATENT DOCUMENTS

| | | | |
|---|---|---|---|
| 6,504,621 B1 * | 1/2003 | Salgado | 358/1.16 |
| 6,651,081 B1 * | 11/2003 | Salgado et al. | 718/103 |
| 7,254,464 B1 | 8/2007 | McLurkin et al. | |
| 7,305,371 B2 | 12/2007 | Brueckner et al. | |
| 7,844,969 B2 * | 11/2010 | Bigagli et al. | 718/103 |
| 2004/0128669 A1 | 7/2004 | Furst et al. | |
| 2005/0004974 A1 | 1/2005 | Sharma et al. | |
| 2006/0268317 A1 * | 11/2006 | Lofthus et al. | 358/1.15 |
| 2007/0146772 A1 | 6/2007 | Castellani | |
| 2007/0146773 A1 | 6/2007 | Harrington et al. | |
| 2007/0260716 A1 | 11/2007 | Gnanasambandam et al. | |
| 2008/0082933 A1 | 4/2008 | Howard et al. | |
| 2008/0222154 A1 | 9/2008 | Harrington et al. | |
| 2009/0158288 A1 * | 6/2009 | Fulton et al. | 718/103 |
| 2009/0262383 A1 * | 10/2009 | Gaebel et al. | 358/1.15 |

OTHER PUBLICATIONS

U.S. Appl. No. 11/824,065, filed Jun. 29, 2007, Venable.
U.S. Appl. No. 12/129,195, filed May 29, 2008, Gnanasambandam et al.
Quiroz et al., "Clustering Analysis for the Management of Self-monitoring Device Networks", ICAC (2008).
Balfanz et al., "Talking to Strangers: Authentication in Ad-Hoc Wireless Networks", Palo Alto Research Center, Palo ALto, CA, Mar. 2002.
HP CoudPrint, "Share, Print and Store Documents with your Mobile Phone", www.cloudprint.hpl.hp.com/help.shtml. Kindberg et al., "People, places, things: web presence for the real world", Internet Systems and Labs, Palo Alto, CA, www.cs.colorado.edu, Fall 2007.
Kindberg et al., "Towards a Real-World Wide Web", Internet and Mobile Systems Lab, Hewlett-Packard Co., Apr. 2000.

* cited by examiner

*Primary Examiner* — Meng An
*Assistant Examiner* — Abu Z Ghaffari
(74) *Attorney, Agent, or Firm* — Fay Sharpe LLP

(57) ABSTRACT

A system and method for enabling automated task preemption, including a plurality of multifunctional devices having a plurality of functional capabilities; and a processing module configured to: (i) separate the tasks requiring the plurality of functional capabilities into the tasks requiring a first category of capabilities and the tasks requiring a second category of capabilities, where the tasks requiring the first category of capabilities has a higher processing priority than the tasks requiring the second category of capabilities; and (ii) selectively process the tasks requiring the first category of capabilities before the tasks requiring the second category of capabilities regardless of arrival times of the tasks requiring the plurality of capabilities; wherein the tasks requiring the second category of capabilities that are preempted by the tasks requiring the first category of capabilities are rescheduled to be completed within a predetermined time period of completion.

25 Claims, 6 Drawing Sheets

$$A^* = \underset{A_{ijk} \in \{0, 1\}}{argmax} \sum_{k=1}^{K} \sum_{j=1}^{M} \sum_{i=1}^{N} A_{ijk} C_j(t, \omega\delta(\eta))$$

s.t.

$$\sum_{j=1}^{M} A_{ijk} C_j(t, \omega\delta(\eta)) \geq P_c, \forall i, k \quad (1)$$

$$\sum_{j=1}^{M} A_{ijk} = 1, \forall i, k \quad (2)$$

$$\sum_{k=1}^{K} A_{ijk} \leq 1, \forall i, j \quad (3)$$

$$A_{ijk} \in \{0, 1\}, \forall i, j, k$$

|   | SYMBOL | DESCRIPTION |
|---|---|---|
| 1. | $A^*$ | set of $A_{ijk}$ values where $A_{ijk}$ is 1 if the $i^{th}$ work-unit and $k^{th}$ replicate is assigned to $j^{th}$ device |
| 2. | $M$ | Number of available devices |
| 3. | $N$ | number of work-units = total_pages / $\eta$ |
| 4. | $\eta$ | size of work unit in pages |
| 5. | $K$ | number of replicates per work-unit |
| 6. | $t$ | current time |
| 7. | $\delta(\eta)$ | average processing time of a work-unit (one time-window) |
| 8. | $\omega$ | number of look-ahead time windows |
| 9. | $C_j(x, y)$ | completion probability for a class 2 task for time duration $y$ starting at time $x$ on machine $j$ |
| 10. | $\lambda_{1j}(t, \omega\delta(\eta))$ | arrival rate of class 1 task for time duration $\omega\delta(\eta)$ starting at time $t$ on $j^{th}$ device |
| 11. | $\mu_{1j}(t, \omega\delta(\eta))$ | processing rate of class 1 task for time duration $\omega\delta(\eta)$ starting at time $t$ on $j^{th}$ device |
| 12. | $Pc$ | required first-try completion guarantee expressed as a fraction in (0, 1) |

| ALGORITHM 1 CLASS 2 WORK-UNIT REJECTION ALGORITHM |
|---|
| Input: current time $t$; number of jobs in class 2 queue $n_2$; $\delta(\eta)$; the node $j$ that is participating as the service provider; $pc$ required completion probability<br>Output: number of work-units $d$ to drop from the tail of the queue<br>1. set $t' = t$<br>3. for $m = 1$ to $n_2$     // m denotes position from the head of the queue<br>4.     compute $pj = Cj(t', \delta(\eta))$<br>5.     if $pj > pc$<br>        continue<br>      else<br>        break<br>6.     set $t' = t' + \delta(\eta)$<br>7. end (of for loop)<br>8. return $d = n_2 - m$, the number of tasks to be rejected |

FIG. 5

SYSTEM AND METHOD PROVIDING FOR RESOURCE EXCLUSIVITY GUARANTEES IN A NETWORK OF MULTIFUNCTIONAL DEVICES WITH PREEMPTIVE SCHEDULING CAPABILITIES

BACKGROUND

1. Field of the Related Art

This disclosure relates to an approach for controlling scheduling policies in a multifunctional device environment, and, more particularly, to a system and method for providing for automatic lossless job preemption in a multifunctional device environment by using class-specific scheduling polices.

2. Description of the Related Art

The concept of "network printing," in which any of a plurality of computers submit digital data to one of any number of printers over a network, is well known. A conventional printing system uses a client/server architecture that usually includes three primary components. These components include (i) a client, (ii) a server, and (iii) an output device. The client conveys print and management requests to the server and receives responses from the server that arise in response to the submitted requests. The server receives these requests from the client, performs the required actions for each request, and returns the responses to the client. One such request from a client is a print request, i.e., a request to print one or more copies of one or more documents, with the printed pages output using one or more features. A print request may represent a collection of one or more documents to be printed, as well as instructions for printing. The server organizes the documents indicated in the print request submitted by the client into a print job. The server then sends the print job and any associated job control commands to an output device.

The output device is a physical device, or hardware, that is capable of rendering images of documents and producing hard copy output of the print jobs received from the server. The output device can then return responses to the server regarding its current state or the status of the received print jobs. The output device is commonly a printer. However, the output device may also be any type of multifunction device (MFD).

In general, a MFD operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, since MFDs are universally used, it would be useful to enable task/job distinguishment/discrimination among a plurality of MFDs and to treat such tasks/jobs associated with the MFDs differently based on a variety of factors, such as priority schemes.

For example, some single-MFD and/or local jobs are submitted directly to an MFD. Other jobs, such as large optical character recognition (OCR) jobs, are very resource and time consuming and often take several minutes to complete, particularly for complex documents. The MFD receiving the jobs needs to complete both kinds of jobs (the former is run locally and the latter in a distributed fashion) in a timely fashion. In such environments, priority schemes are useful—as local single—MFD jobs can be provided the complete set of resources of the MFD while a copy of the OCR jobs can be safely dropped because of replication schemes that will guarantee completion.

While it is known that MFDs are idle for high percentages of time, thereby wasting good computing resources, MFDs, on the other hand, also need the collective totality of those resources for intensive image/document related processing during the busy times, thus operating together on various kinds of tasks. It is thus desirable to better distinguish/discriminate between tasks processed by one or more MFDs connected to a network.

SUMMARY

In an embodiment of the present disclosure, for enabling automated task preemption, the system including a plurality of multifunctional devices being operatively associated with at least one controller, each one of the plurality of multifunctional devices having a plurality of functional capabilities; and a processing module configured to: (i) separate the plurality of functional capabilities of the plurality of multifunctional devices into tasks requiring a first category of capabilities having a first loss tolerance and tasks requiring a second category of capabilities having a second loss tolerance, where the tasks requiring first category of capabilities has a higher processing priority than the tasks requiring second category of capabilities and where the first loss tolerance is less than the second loss tolerance; and (ii) selectively process the tasks requiring the first category of capabilities before the tasks requiring second category of capabilities regardless of arrival times of the tasks requiring the plurality of capabilities to the at least one controller; wherein the tasks requiring the second category of capabilities that are preempted by the tasks requiring the first category of capabilities are rescheduled to be completed within a predetermined time period of completion, thus resulting in zero-net of loss of tasks.

In an embodiment of the present disclosure, a method for enabling automated task preemption, including the steps of operatively associating a plurality of multifunctional devices with at least one controller, each one of the plurality of multifunctional devices having a plurality of functional capabilities; and performing processing via a processing module configured to: (i) separate the tasks requiring a plurality of functional capabilities of the plurality of multifunctional devices into tasks requiring a first category of capabilities having a first loss tolerance and a tasks requiring second category of capabilities having a second loss tolerance, where tasks requiring the first category of capabilities has a higher processing priority than the tasks requiring second category of capabilities and where the first loss tolerance is less than the second loss tolerance; and (ii) selectively process tasks requiring the first category of capabilities before the tasks requiring the second category of capabilities regardless of arrival times of the tasks requiring the plurality of capabilities to the at least one controller; wherein tasks requiring the second category of capabilities that are preempted by tasks requiring the first category of capabilities are rescheduled to be completed within a predetermined time period of completion.

In an embodiment of the present disclosure, a system is presented including a processor; and a computer-readable storage medium in communication with said processor, the computer-readable storage medium comprising one or more programming instructions for: electronically separating tasks requiring a plurality of functional capabilities of a plurality of multifunctional devices into tasks requiring a first category of capabilities having a first loss tolerance and tasks requiring a second category of capabilities having a second loss tolerance, where tasks requiring the first category of capabilities has a higher processing priority than tasks requiring the second category of capabilities and where the first loss tolerance is less than the second loss tolerance, and electronically selectively processing tasks requiring the first category of capabilities before tasks requiring the second category of capabilities regardless of arrival times of tasks requiring the plurality of capabilities; wherein tasks requiring the second category of capabilities that are preempted by tasks requiring the first category of capabilities are rescheduled to be completed within a predetermined time period of completion.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

Other features of the presently disclosed system and method for scheduling jobs will become apparent from the following detailed description, taken in conjunction with the accompanying drawings, which illustrate, by way of example, the presently disclosed system and method for scheduling jobs.

BRIEF DESCRIPTION OF THE DRAWINGS

Various embodiments of the present disclosure will be described herein below with reference to the figures wherein:

FIG. 3 is an illustration of an optimization model for separating incoming jobs/tasks into two separate classes, in accordance with the present disclosure;

FIG. 4 is a table illustrating the notation used in the optimization model of FIG. 3, in accordance with the present disclosure;

FIG. 5 is an algorithm for rejecting work-units that reside in a queue including jobs/tasks related to a class, in accordance with the present disclosure.

DETAILED DESCRIPTION OF THE PREFERRED EMBODIMENTS

Figure 1:
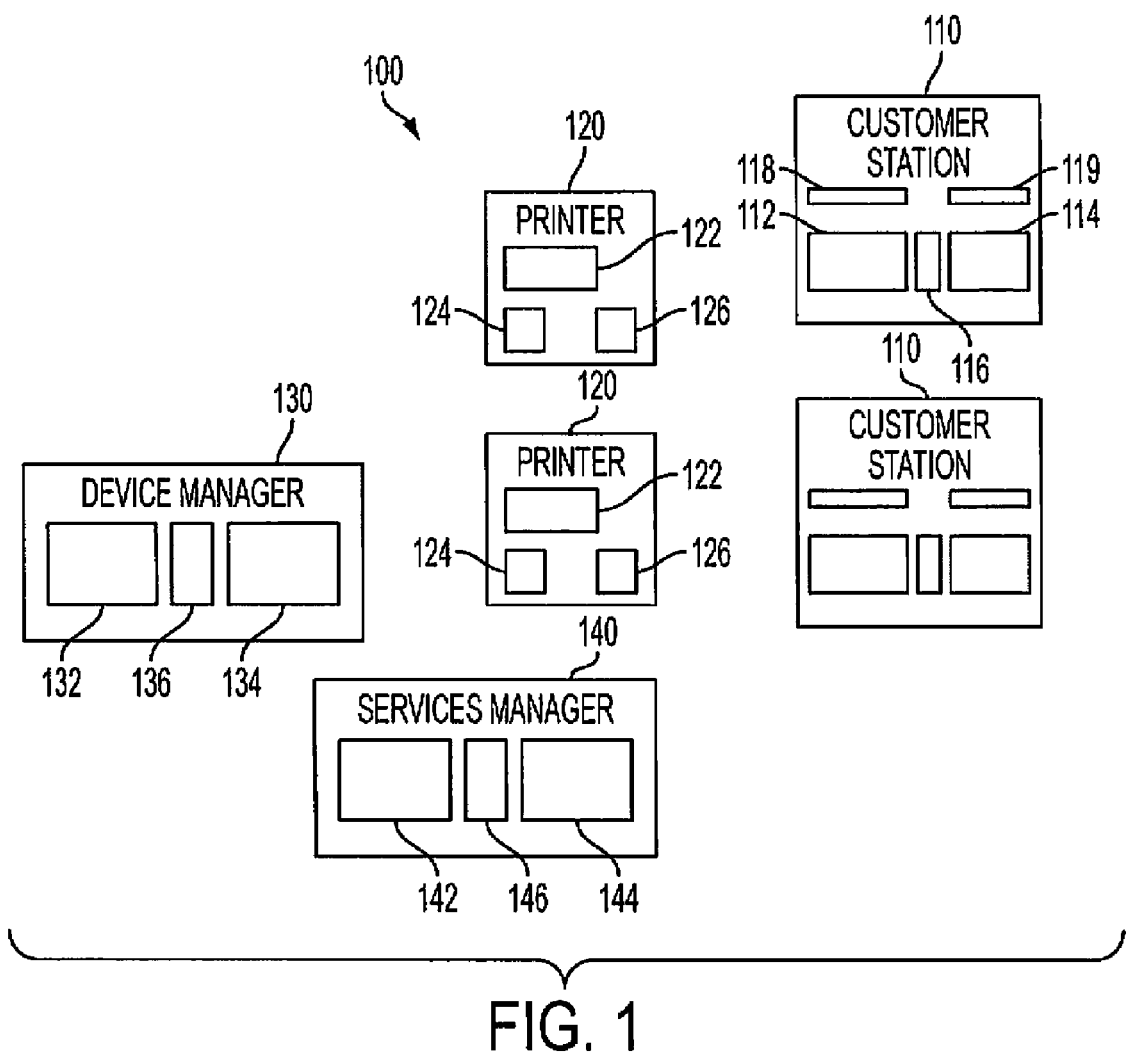
FIG. 1 is a block diagram of a system incorporating a plurality of MFDs for automatic lossless job/task preemption by using class specific scheduling processes, in accordance with the present disclosure.

Referring now to the drawing figures, in which like references numerals identify identical or corresponding elements, a system and method for controlling automatic lossless job preemption in a multifunctional device environment by using class-specific scheduling polices, in accordance with the present disclosure will now be described in detail.

The present disclosure proposes one or more algorithms for simultaneously providing resource exclusivity guarantees on a first type of MFD jobs while promising that a second type of jobs will definitely be complete in a grid-enabled MFD environment. A grid-enabled MFD environment may have two job classes with different expectations: (a) core MFD jobs (e.g., class 1) that require 100% of MFD resources for computation intensive tasks irrespective of other jobs' requirements and (b) grid jobs (e.g., class 2) that are elastic/flexible to the requirements of core jobs in terms of being able to relinquish resources to core jobs and still complete on time.

The present disclosure further proposes scheduling replicated class 2 sub-jobs such that the whole class 2 job has a high completion probability by taking advantage of time-of-day sensitive time-series models for class 1 jobs. Even in the unlikely event that all of the replicates are preempted or dropped owing to the arrival of class 1 jobs, the MFD grid backs off and reschedules the class 2 jobs.

The present disclosure provides various strategies to release resources for the class 1 jobs when class 2 jobs are preempted or rejected. Furthermore, the exemplary embodiments of the present disclosure reject tasks of the more elastic/flexible class 2 type only if the completion probabilities of those tasks are not above the set threshold to address network overhead. Thus, the present disclosure proposes a class-sensitive scheduling and preemption mechanism in a multi-class MFD grid environment with quantifiable guarantees on job completion and rejection.

Additionally, when using the MFD grid of interconnected MFDs for computationally distributable activities they tend to grab CPU cycles away from core MFD functionality. Core MFD functionality (also referred to as core jobs) may include printing, scanning, copying, emailing, and faxing that a user has specifically directed to a device, most commonly by the physical presence of the user at the device. The other class of activities, termed grid jobs, include jobs created or sub-divided by the grid, grid upkeep activities, jobs not created by a user (but by the grid on his/her behalf) and the like.

While both job types are important, grid jobs have greater flexibility than core jobs because of the way the grid of MFDs has been architected. Hence, the core jobs are referred to as class 1 jobs and the grid jobs are referred to as class 2 jobs, with class 1 jobs/tasks having a higher priority than class 2 jobs/tasks. This also means that class 2 jobs can be preempted by class 1 jobs. Next, there is another reason why class 1 jobs are given higher priority. While MFDs are powerful devices, the reason they have been endowed with such power is the high processing requirements of some image processing jobs. Hence it is not worthwhile for the grid jobs to grab resources (memory, CPU, network etc.) at the same time of core job, especially when they are more elastic/flexible.

Thus, the present disclosure further proposes a task preemption algorithm that ensures that: (a) the MFDs can harness all power when core MFD functionality is needed by the user; (b) while the MFDs are not processing core jobs, their idle time is effectively utilized for grid jobs; and (c) the algorithm satisfies a recovery property that assures that the overall class 2 job be complete even when certain sub-jobs are preempted or dropped in order to achieve the aforementioned first objective.

Additionally, the exemplary algorithms of the exemplary embodiments of the present disclosure can distinguish core jobs from grid jobs (and/or sub-divided grid jobs) given the concurrency conditions of many of the jobs and the portions of the device controller they access (e.g. main controller, daughter card, EIP server etc.). Thus, the exemplary algorithms safely expose certain APIs (application programming interface) that promote higher utilization of MFDs in the presence of the mixed class of jobs (e.g., core jobs, grid jobs).

As a result, a number of aspects of the present disclosure relate to: (1) Scheduling with completion guarantees for class 2 grid jobs, (2) Strategies for separating grid jobs from core MFD jobs, which relates to designing for the lossless nature of class 2 jobs while simultaneously providing resource exclusivity for class 1 jobs, (3) Time-of-day models for devices in the grid, which scheduling takes advantage of, (4) Job rejection as a function of completion probability to address transmission overhead/network traffic, and (5) Storing the grid jobs or their parts in a distributed data-structure and resumption logic thereof, so that any MFD could resume preempted or rejected class 2 jobs.

Prior to describing the present disclosure in further detail, it will first be helpful to define various terms that will be used throughout the following discussion. For example:

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

The term "printer device" can refer to a multifunction device (MFD). The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

As used herein, "print job" is not limited to a particular electronic format, such a bitmap, but can include any suitable format including PDF, word processor formats, rich text (RTF), etc., as will be appreciated by those skilled in the art.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device. Furthermore, the term "connected grid of MFDs" relate to MFDs and/or other devices tied together by software so that they can perform a parallel job together.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "task" refers to a print, scan, copy, and/or fax job or any type of function that may be performed by an MFD. The term "task" may also refer to an execution path through address space, such as a set of program instructions that are loaded in a data storage means. The term "task" may also refer to a basic unit of programming that an operating system controls and depending on how the operating system defines a task in its design, this unit of programming may be an entire program or each successive invocation of a program. The term "task" may be synonymous with or refer to jobs or activities or capabilities. The term "task" may also refer to a grid job (a parallelizable job) or portions thereof.

The term "processing" may refer to determining the elements or essential features or functions or processes of a plurality of MFDs and/or to subject the plurality of MFDs to computational processing. The term "process" may further refer to tracking data and/or collecting data and/or manipulating data and/or examining data and/or updating data on a realtime basis in an automatic manner and/or a selective manner and/or manual manner.

The term "module" refers to a self-contained component (unit or item) that is used in combination with other components and/or a separate and distinct unit of hardware or software that may be used as a component in a system, such as a printing system including a plurality of MFDs. The term "module" may also refer to a self-contained assembly of electronic components and circuitry, such as a stage in a computer that is installed as a unit.

The term "preempt" may refer to have precedence or predominance over. The term "preempt" may be equivalent to or refer to superseding, supervening, supplanting, or replacing.

In the exemplary embodiments of the present disclosure, the network is an MFD grid (or connected network of MFDs). However the disclosure is not limited thereto and other networks may be used in which many nodes in the network can alternatively take the role of server and client depending on the need. Furthermore, in the exemplary embodiments described herein, the job/task may require that optical character recognition (OCR) is performed on a data file (this is an example of a class 2 grid job). However, the job is not limited to jobs that require OCR, but may be any job that requires an operation in which the job can be split up into portions, such as Raster Image Processing, text indexing, image manipulation, text searching, gamut mapping, image quality enhancement, etc.

Embodiments will be described below while referencing the accompanying figures. The accompanying figures are merely examples and are not intended to limit the scope of the present disclosure.

With initial reference to FIG. 1, there is presented a block diagram of a system incorporating a plurality of MFDs for automatic lossless job/task preemption by using class specific scheduling processes, in accordance with the present disclosure.

System 100 includes a customer station 110, a printer device 120, a device manager 130 and a services manager 140, each of which includes a respective processing device (including or accessing at least one storage device), a respective software module executable on the associated processing device and a respective communication device. The respective communication devices facilitate communication between the various processors, as described further below.

The printer device 120 may be purchased or rented from a product manufacturer or product dealer together with the purchase of a sales contract which includes terms for providing consumable supplies associated with use of the printer device 120. The customer station 110 may be operated by an authorized operator or administrator or ISO (disclosed further below) associated with the customer. As described further below, the services manager 140 receives requests from the customer station 110.

The services manager 140 further monitors task/job requests by the printing device 120. As the printer is operated it records data about the task/job requests and transmits the data to the device manager 130. The services manager 140 receives the task/job requests data from the device manager 130 and stores the task/job request data for the printer. The services manager includes a processor 142, a supply control software module 144 and at least one communication device 146.

The system 100 is now described in greater detail. The customer station 110 may be a computing device such as a computer workstation, a personal computer, a handheld device, e.g., a personal digital assistant, etc. The customer station 110 is provided with a processor 112 and customer portal software module 114 executable on the processor 112 or accessible to the processor 112. The customer station 110 further includes at least one communication device 116 for exchanging information between the processor 112 and another processor, such as a processor of the services manager 140. The customer portal module 114 includes a series of programmable instructions capable of being executed or accessed by processor 112. The series of programmable instructions can be stored on a computer-readable medium, such as RAM, a hard drive, CD, smart card, 3.5" diskette, etc., or transmitted via propagated signals for being executed by the processor 112 for performing the functions disclosed herein and to achieve a technical effect in accordance with the disclosure.

The customer portal module 114 may be stored by customer station 110 in non-volatile memory, such as a hard drive, or volatile memory, such as RAM. The customer portal module 114 may be installed at the time of manufacture, or by the user, such as by installing the software from a CD or by downloading or accessing the software from a website provided by the manufacturer of the printer device 120.

The customer station 110 includes a display device 119 (such as a computer monitor) and an input device 122 (such as keyboard, mouse, etc.). The customer portal module 114 generates a graphical user interface (GUI) 118 displayable on the display device 119 for interacting with the administrator or user. The GUI 118 provides a graphical interface, such as a form displayed on the display device 119, which the user uses to place task/job requests. The user can submit the order using the GUI 118.

The customer station 110 may be part of one or more networks, such as a LAN, WAN, intranet or the Intranet which facilitates communication between the customer station 110 and the services manager 140. The at least one communication device 116 provides communication between the processor 112 and the network. The at least one communication device 116 includes, for example, a modem, router and/or Ethernet port.

The printer device 120 includes a processor 122, a meter software module 124, and at least one communication device 126. The device may be any apparatus whose operation enables the processing of one or more job/task requests.

The meter module 124 includes a series of programmable instructions capable of being executed by processor 122. The series of programmable instructions can be stored on a computer-readable medium, such as RAM, a hard drive, CD, smart card, 3.5" diskette, etc., or transmitted via propagated signals for being executed by the processor 122 for performing the functions disclosed herein and to achieve a technical effect in accordance with the disclosure.

As the printer device 120 is operated to execute print jobs the information related to the jobs performed by the printer are recorded by the meter module 124. The data is stored by the processor 122 on a storage device (not shown) included with or accessed by the processor 122. For example, the meter module 120 records the number of impressions or pages that are printed. The meter module 124 may keep a running tally of the total number of pages printed and/or the number of pages printed since a most recent report was generated. The tally for large pages or impressions may be weighted to account for their size. For example, a large page may be tallied as two pages. It is envisioned that the meter module 120 may record additional information, such as the type of job/task sent to the MFD (e.g., core job, grid job, etc).

The printer device 120 may be part of one or more networks, such as a LAN, WAN, intranet or the Internet which facilitates communication between the printer device 120 and the device manager 130. The at least one communication device 126 provides communication between the processor 122 and the network. The at least one communication device 126 includes, for example, a modem, router and/or Ethernet port. The printer device 120 receives printer job requests from one or more computers (which may or may not include the customer station 116) which are coupled to or networked (e.g., via a LAN, WAN or intranet) to the printer device 120.

The device manager 130 is a computing device including a processor 132, a device manager software module 132 and at least one communication device 136. The device manager module 134 receives requests made by users to the plurality of MFDs.

The device manager module 134 forwards the type of requests made to the Services Manager 140. The device manager module includes a series of programmable instructions capable of being executed by processor 132. The series of programmable instructions can be stored on a computer-readable medium, such as RAM, a hard drive, CD, smart card, 3.5" diskette, etc., or transmitted via propagated signals for being executed by the processor 132 for performing the functions disclosed herein and to achieve a technical effect in accordance with the disclosure.

The device manager 130 communicates with the printer device 120 and the services manager 140 via its communication device(s) 136. The device manager 130 may be part of one or more networks, such as a LAN, WAN, intranet or the Internet which facilitates communication between the device manager 130 and the services manager 140 and between the device manager 130 and the services manager 140. Different networks may be used by the device manager 130 for communicating with the printer device(s) 120 and the services manager 140. The at least one communication device 136 provides communication between the processor 132 and the at least one network. The at least one communication device 136 includes, for example, a modem, router and/or Ethernet port.

The supply control module 144 includes a series of programmable instructions capable of being executed by processor 142. The series of programmable instructions can be stored on a computer-readable medium, such as RAM, a hard drive, CD, smart card, 3.5" diskette, etc., or transmitted via propagated signals for being executed by the processor 142 for performing the functions disclosed herein and to achieve a technical effect in accordance with the disclosure.

The processor 142 includes or accesses at least one data storage device which stores data associated with each printer device 120 that is transmitting request data and type of data to the device manager 130.

In summary, FIG. 1 enables the communication between a plurality of users and a plurality of MFDs and aids a device manager and a service manager in determining the type of request made (e.g., a core job or a grid job). The core jobs may be referred to as tasks requiring a first category of capabilities, whereas the grid jobs may be referred to as tasks requiring a second category of capabilities. Capabilities merely refers to the tasks/jobs/activities/requests that the plurality of users may perform via the plurality of MFDs. The tasks requiring the first category of capabilities are user enabled tasks/jobs/activities that are externally created by a user, whereas the tasks requiring second category of capabilities are grid activities that are internally created by the plurality of MFDs. Additionally, the tasks requiring the first category of capabilities may have stringent access requirements to MFD resources, whereas the tasks requiring the second category of capabilities may have flexible access requirements to MFD resources. In other words, the first category of capabilities may have a higher priority with regards to processing, as explained further in detail below with reference to FIG. 2.

Figure 2:
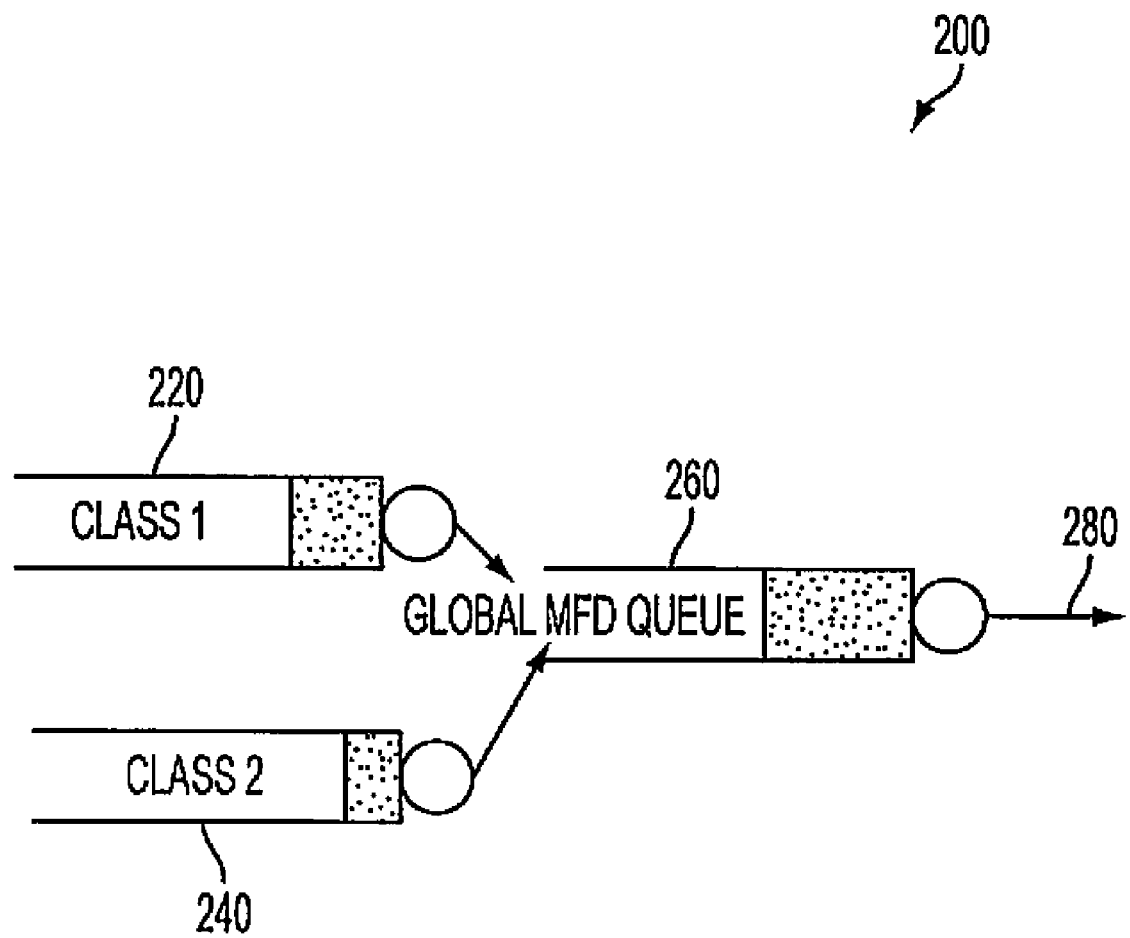
FIG. 2 is a block diagram of an MFD that separates incoming jobs/tasks into two classes, in accordance with the present disclosure.

Referring to FIG. 2, there is presented a block diagram of an MFD that separates incoming jobs/tasks into two classes, in accordance with the present disclosure. The block diagram 200 includes a first class 220, a second class 240, a global MFD queue 260, and an output 280.

FIG. 2 illustrates how a plurality of tasks/jobs/activities/capabilities are separated into two classes. A first class 220 including core tasks and a second class 240 including grid tasks. The first class 220 of tasks and the second class 240 of tasks are transmitted to a global MFD queue 260, where the tasks are tagged as belonging to one of two queues. A first queue for the first class 220 of tasks and a second queue for the second class 240 of tasks. The output 280 indicates that the first class 220 of tasks are processed before the second class 240 of tasks. In other words, the second class 240 of tasks are preempted by the first class 220 of tasks. The first class 220 of tasks has a higher priority than the second class 240 of tasks because the first class 220 of tasks are core MFD tasks, whereas the second class 240 of tasks are grid tasks.

FIG. 2 represents a case where there are 2 classes of jobs (e.g., the core jobs in the first class 220 and the grid jobs in the second class 240). Each class may be processed separately by a processing module, but they may be held in the same queue after tagging as class 1 or class 2. Note that there may be more than 2 classes of jobs. User dispatched jobs handled at a chosen MFD are different from those jobs that the grid sub-divides and sends all over the interconnected MFD grid in order to get processed. The aforementioned job types have different tolerances for getting dropped, delayed, user reaction and experience, and the robustness that is built in to handle the respective types. Because of these differences it is preferred to divide the jobs into two classes.

For example: Class 1: Core MFD jobs from users (e.g., print, scan, email, copy, fax and/or other jobs where the user is at the machine). Class 2: Grid jobs (jobs or sub-jobs not created on the primary MFD where the user initiated a service request of any kind where in the grid transported the complete job and/or parts thereof for parallel-execution).

After the jobs are separated into two categories of varying capabilities, and after a separate class is established for each category of jobs/tasks/capabilities, a relationship is established between the class 1 jobs and the class 2 jobs. For instance, the class 2 queue may sense/monitor/track the load/volume of activity of class 1 queue (of device and/or other devices). This could be accomplished through an SNMP (simple network management protocol) and Web Services call to the concerned device's job monitoring MIB (management information base, e.g., JobMon) to note the origin and status of the jobs/tasks/activities/capabilities in the queue. Other methods such as custom programming interfaces are also feasible for job status monitoring. Every MFD that supports the aforementioned two class architecture is built such that the class 2 tasks are more elastic/flexible than the class 1 tasks. In other words, if class 2 tasks are dropped, the system does not face a severe penalty. However, class 2 tasks could be rescheduled in order to account for elasticity/flexibility requirements that class 1 poses on class 2 jobs. The rescheduling may be automatically performed based on availability and time-constraints.

For example, the following equation may be used to determine how to handle the rejected class 2 jobs. (Refer to Table 1 for notation definitions, FIG. 4)

$$C_j(t, \omega\delta(\eta)) \approx 1 - \frac{\lambda_{1j}(t, \omega\delta(\eta))}{\mu_{1j}(t, \omega\delta(\eta))}$$

Where $C_j$ is the completion probability of class 2 work-unit under time-of-day dependent loading conditions of class 1 tasks. Given that $\lambda_{1j}$ and $\mu_{1j}$ can be measured, one can compute the load relating to class 1 tasks. Also the approximation comes from the time window not being mapped to an exact window corresponding to (t, t+ωδ(η)). The mapping of the time window (t, t+ωδ(η)) is performed by taking a combination of standard time-windows (such as 1 hour intervals during the work day) for which $\lambda_{1j}$ and $\lambda_{1j}$ are measured over several weeks or months and captured as the corresponding time-of-day time-series models. In this way, the class 2 queue senses/monitors/tracks the class 1 load depending on the time-series model corresponding to a given time of day.

Furthermore, role dependent scheduling actions for class 2 jobs and preemption strategies may be employed. For instance, in catering to grid jobs, each MFD may be operating in different roles. Depending on the roles, the scheduling actions of the MFD corresponding to class 2 jobs vary (note that class 1 jobs are mostly FCFS (first come, first-served) unless user intervenes to reorder). In the following paragraphs, a description of the roles and the scheduling actions is further described.

Concerning the concept of an orchestrator: In the role of an orchestrator, the class 2 queue is the point of origin of the grid job. For example, when parallel OCR is performed, it is the device where the job is scanned that acts as the orchestrator. Thus, the job was originated at the device by the user scanning, making it possible to claim it is a class 1 job. While this is true, in some cases the job may come in electronically, for example, through email without the user's physical presence at the device. Only in the latter case will policies/rules be established because if the former case is claimed, i.e., job being class 1, it automatically assumes FCFS-type precedence and resource exclusivity.

The term "rule" may refer to a principle and/or condition where one or more MFDs are caused to perform one or more requested tasks according to a preset/predetermined default mode as a result of the principles and/or conditions when the task is requested. The term "rule" may also refer to a prescribed guide for action for the plurality of MFDs.

A rules engine may be employed to execute the established rules/policies. The rule engine evaluates the rules and/or policies after comparing them to the data collected from a data tracking module, user profile, MFD profile, and usage history, thus obtaining a set of candidate rules for execution. The rules engine then evaluates the rules and/or policies on this set of candidate rules and the situation, and further filters and/or prioritizes the rules and/or policies. Finally, the rules engine selects one or more rules and/or polices to execute, by evaluating a final-selection rules and/or policies. The rule selection process may be based on the user name, the MFD name, the user location, the MFD location, usage history of user, usage history of MFD, access times, printing requirements, size of output job, paper requirements, and/or priority of the rule or policy. The rule selection process may also be based on statistical comparison data, as for example, rules based on patterns generated from one or more collected, tracked, and analyzed data. These statistical techniques may enable enforcement of corporate policies/rules concerning what types of traffic are acceptable or permissible by users. The system administrator may also evaluate the data for compliance with preset rules and/or policies.

Therefore, if the job/task/capability was in fact a grid job (e.g., class 2) with the concerned MFD being the orchestrator, two cases arise:

Case 1: Class 2 job is still in the queue and class 1 job arrives. In this case, the class 1 job automatically assumes precedence (preemption) and moves to the global MFD queue for processing.

Case 2: Class 2 job has moved to the global MFD queue and is in some stage of processing. If the job is in some stage of processing, two more sub-cases arise.

Case 2A: Move the job to class 2 queue of MFD. In this case, the MFD moves the job to the class 2 queue and looses all state information for already started class 2 sub-jobs. Once the class 1 job concludes, the class 2 job restarts because state in maintained. This is called the preemptive restart as far as the class 2 job is concerned.

Case 2B: Terminate job on MFD and expect different peer to restart job. In this case, the MFD looses the job as well as the state information. The orchestrator role itself is abandoned temporarily (for that job) and another peer restarts the job.

To enable case 2B, right at the beginning, jobs or portions thereof are stored on a distributed file system. A "resumption logic" for another idle orchestrator may be that if that file remained for more than a particular duration it may bid on processing the file.

In favor of providing, the class 1 job immediate and complete access to all resources (i.e., resource exclusivity), the state information of class 2 after the job started and got preempted is not stored. In both cases, the job is stored on the grid's distributed file system at the beginning of the job so that the class 1 job does get complete RAM and CPU resources. Case 2A and Case 2B differ in the way a class 2 job state is maintained or deleted due to a class 1 job arrival. Concerning the concept of a service provider: In the role of a service provider, the class 2 queue holds grid sub-jobs. In other words, these jobs must have been received from some other orchestrator in the network. Understandably, these are lower priority jobs. Since the grid is built with tolerance to dropping class 2 jobs, most class 2 jobs are immediately dropped if they are under processing (i.e., global MFD queue). After a small tolerance period T, any more class 2 jobs in the class 2 queue are also dropped. This is because, if the class 1 job is in fact huge, there is no rationale to hold the other class 2 jobs for a long period because some orchestrator will reschedule it.

In general, a decentralized preemptive drop policy has been adopted with a small tolerance period T. Reliance on the scheduling mechanism of the orchestrator is preferred to take into account the drop rates when scheduling sub-jobs. In other words, if a class 2 queue frequently gets flushed, say, because a machine erratically comes on and off relative to the processing time of the sub-job, then the scheduling mechanism avoids such nodes by ranking them lower. Alternatively, it could compensate for such nodes using other scheduling mechanisms and prevent aggressive dropping as mentioned above.

FIG. 3 is an illustration of an optimization model for separating incoming jobs/tasks into two separate classes, in accordance with the present disclosure. The optimization model 300 provides the optimum allocation of work-units to service providers.

The optimization model 300 provides the optimum allocation of work-units to service providers. The orchestrator solves the following problem using a linear programming solver, as an example. Multiple orchestrators could get involved by dividing the initial number of pages amongst them first. However, the structure of the optimization problem does not change. In other words, there could be {N1, N2, ... $N_q$} work-units with q orchestrators achieving decentralized orchestration (which involves scheduling, splitting and/or merging). Each orchestrator learns over time a value K which is the number of replications for each work-unit it would create. Likewise each orchestrator has its own value for M and N. Since the structure of the optimization problem is the same as mentioned earlier, the exemplary embodiments describe the problem dropping the index for the orchestrator. The aforementioned problem is solved by the orchestrator(s) and would ensure that the completion probability for every work-unit would be at least $p_c$ (constraint 1). Constraint 2 ensures that every work unit is assigned only once. Constraint 3 ensures that no two replicates of the same work-unit are assigned to the same node.

Therefore, the exemplary embodiments of the present disclosure provide certain details on the optimization problem that provides a certain robustness guarantee for scheduling class 2 tasks in a multi-class MFD. The exemplary embodiments compensate any dropped work-units and/or rejection because of time-of-day related busy periods owing to class 1 arrivals. These models are useful when class 1 job arrivals are rather sporadic.

FIG. 4 is a table illustrating the notation used in the optimization model of FIG. 3, in accordance with the present disclosure. The table 400 includes 12 notations related to the equation of FIG. 3.

Note that $\omega$ is usually chosen to be around $K*N$; $\delta(\eta)$ is usually of the order of a few seconds and $\eta$ may be chosen so. Also, $M \gg K$.

FIG. 5 is an algorithm for rejecting work-units that reside in a queue including jobs/tasks related to a class, in accordance with the present disclosure. The algorithm 500 will be explained below.

The rejection algorithm 500 provides details for dropping packets if the node is a service provider. The rejection algorithm 500 is implemented by every service provider. The function $C_j(.)$ is the sensing module as explained above with respect to the separate queues for the separate requested jobs/tasks/activities/capabilities.

The rejection algorithm 500 at the service providers is sensitive to whether the jobs considered to be dropped have a greater chance of waiting for a long time in the queue. In other words, if a job has a good chance that it will complete soon, it will have a lesser chance of getting dropped or rejected. This strategy is useful to address network overhead.

Figure 6:
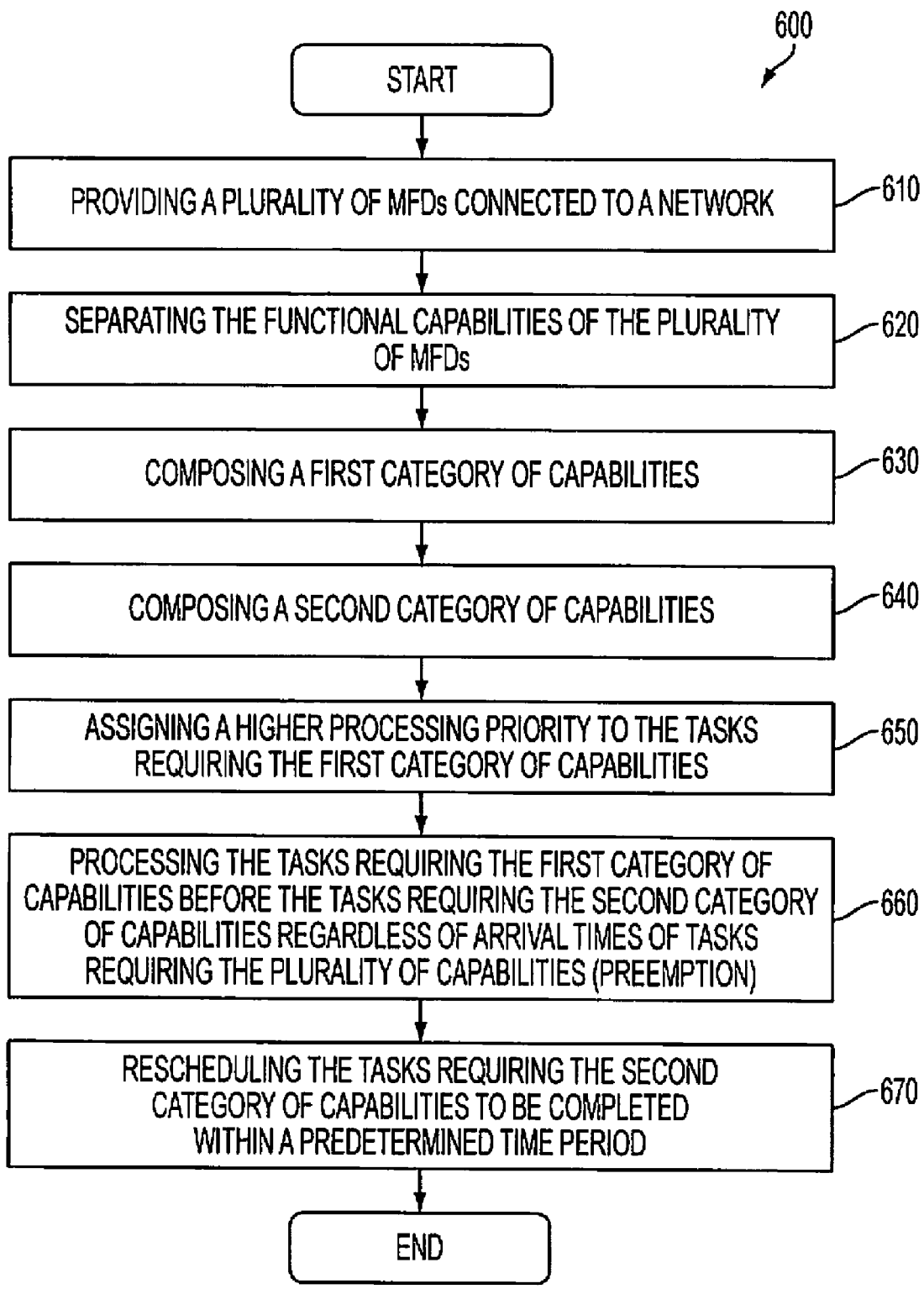
FIG. 6 is a flowchart illustrating the separation of incoming jobs/tasks into two classes, in accordance with the present disclosure.

FIG. 6 is a flowchart illustrating the separation of incoming jobs/tasks into two classes, in accordance with the present disclosure.

The flowchart 600 includes the following steps. In step 610, a plurality of MFDs connected to a network is provided. In step 620, the functional capabilities of the plurality of MFDs are separated. In step 630, a first category of capabilities is composed. In step 640, a second category of capabilities is composed. In step 650, a higher processing priority is assigned to the tasks requiring first category of capabilities. In step 660, the tasks requiring the first category of capabilities is processed before tasks requiring the second category of capabilities regardless of arrival times of the plurality of capabilities. This step may involve preemption of class 2 tasks by class 1 tasks. In step 670, the tasks requiring the second category of capabilities are rescheduled to be completed within a predetermined time period. The process then ends.

In conclusion, the present disclosure proposes algorithms for simultaneously providing resource exclusivity guarantees on a first type of MFD job while promising that a second type of MFD job is definitely complete in a grid-enabled MFD environment. A grid-enabled MFD may have two job classes with different expectations: (a) core MFD jobs (e.g., class 1) require 100% of MFD resources for computation intensive tasks irrespective of other jobs' requirements and (b) grid jobs (e.g., class 2) must be elastic/flexible to the requirements of core jobs in terms of being able to relinquish resources to core jobs and still complete on time. Two forms of class-specific job scheduling policies are provided for these different job types. That is, class 1 jobs would include user jobs (e.g., print, scan, email, copy, fax, or other jobs where the user is at the machine) and class 2 jobs or grid jobs that were not created on the primary device where the user initiated a service request of any kind where in the grid transported the complete job and/or parts thereof for parallel execution.

The algorithms detailed in the present disclosure provide the distinction between core jobs and grid jobs and allow the grid jobs to have guaranteed completion. In theory, they can be applied and further customized to any number of queues that MFDs may have. Class 1 scheduling considers inelastic/inflexible jobs that cannot be preempted. Class 2 scheduling introduces elastic/flexible, distributed and replicated scheduling with the possibility of job preemption. As a result of the two scheduling classes, both kinds of jobs (e.g., core and grid) will be complete by providing quantitative guarantees on (a) resource exclusivity for class 1 and (b) completion probability for class 2.

The present disclosure proposes an alternative method that takes advantage of "job preemption" systems relating to printing jobs/tasks/activities/capabilities on MFDs in order to make the process of printing simple and as streamlined as possible to provide for an efficient user experience. The concept of using a "job preemption" system is a general concept in that it can be used for applications other than printers by any service provider. For example, service providers could use any type of printer and/or MFD and/or electronic device to achieve the desired results of the present disclosure. Also the printing system of the present disclosure makes it easier for information technology (IT) groups and/or service providers to manage/control/operate the printing environment for their clients.

A service provider can be any entity that develops, offers, controls, manages, owns, alters and/or sells software and/or hardware products. A service provider can be any entity that performs one or more tasks on one or more pre-existing MFDs, which may or may not be controlled or owned by the service provider. For example, the entity can offer a service with an existing software package and/or with any type of existing Internet-based service through the Internet. In other words, a service provider need not own or provide the MFDs. The MFDs may be owned or provided by any third party not related or associated with the service provider. In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, or a combination thereof.

The invention claimed is:

1. A system for enabling automated task preemption, the system comprising:
a plurality of multifunctional devices being operatively associated with at least one controller, each one of the plurality of multifunctional devices having a plurality of functional capabilities and a processing module configured to:
(i) separate tasks requiring the plurality of functional capabilities of the plurality of multifunctional devices into intensive tasks requiring a first category of capabilities having a first loss tolerance and requiring approximately all resources and flexible tasks requiring a second category of capabilities having a second loss tolerance greater than the first loss tolerance and being capable of relinquishing resources, where the intensive tasks have a higher processing priority than the flexible tasks; and
(ii) selectively process the intensive tasks before the flexible tasks regardless of arrival times of the tasks requiring the plurality of capabilities to the at least one controller; wherein the flexible tasks that are preempted by the intensive tasks are rescheduled to be processed based on time-of-day activity schemes to ensure that all tasks associated with the multifunctional devices are addressed within a predetermined time period of completion in a given time period.

2. The system according to claim 1, wherein the first category of capabilities includes core multifunctional device capabilities; and wherein the second category of capabilities includes grid multifunctional device capabilities for parallel processing.

3. The system according to claim 2, wherein the core multifunctional device capabilities include user enabled activities created externally by a user; and wherein the grid multifunctional device capabilities include grid activities created internally by the plurality of multifunctional devices.

4. The system according to claim 1, wherein the intensive tasks have stringent quality of service requirements to multifunctional device resources; and wherein the flexible tasks have flexible quality of service requirements to the multifunctional device resources.

5. The system according to claim 1, wherein the automated task preemption involves creating a first queue and a second queue, each queue being separately processed by the processing module; and wherein the second queue monitors the first queue for volume of activity.

6. The system according to claim 1, wherein the flexible tasks are separately stored while the intensive tasks are being processed by the processing module, wherein state information of tasks requiring the second category are stored on a distributed file system of the grid.

7. The system according to claim 1, wherein when a probability of completion of the flexible tasks is greater than the predetermined time period of completion in a given time period, at least one of the flexible tasks is rejected.

8. The system according to claim 1, wherein when the intensive tasks is below a threshold volume of activity level, the flexible tasks is commenced for processing by the processing module.

9. A method for enabling automated task preemption, the method comprising:
operatively associating a plurality of multifunctional devices with at least one controller, each one of the plurality of multifunctional devices having a plurality of functional capabilities; and performing processing via a processing module configured to:
(i) separate tasks requiring the plurality of functional capabilities of the plurality of multifunctional devices into intensive tasks requiring a first category of capabilities requiring a resource and having a first loss tolerance and flexible tasks requiring a second category of capabilities and able to relinquish a resource and having a second loss tolerance greater than the first loss tolerance, where the intensive tasks have a higher processing priority than the flexible tasks;
(ii) selectively process the intensive tasks before the flexible tasks regardless of arrival times of the tasks requiring the plurality of capabilities to the at least one controller; and
(iii) reschedule the flexible tasks that are preempted by the intensive tasks to be completed within a predetermined time period of completion;
wherein the rescheduling is based on time-of-day activity schemes to ensure that all tasks associated with the multifunctional devices are addressed within the predetermined time period of completion in a given time period.

10. The method according to claim 9, wherein the first category of capabilities includes core multifunctional device capabilities; and wherein the second category of capabilities includes grid multifunctional device capabilities for parallel processing.

11. The method according to claim 10, wherein the core multifunctional device capabilities include user enabled activities created externally by a user; and wherein the grid multifunctional device capabilities include grid activities created internally by the plurality of multifunctional devices.

12. The method according to claim 9, wherein the intensive tasks have stringent quality of service requirements to multifunctional device resources; and wherein the flexible tasks have flexible quality of service requirements to the multifunctional device resources.

13. The method according to claim 9, wherein the automated task preemption involves creating a first queue and a second queue, each queue being separately processed by the processing module; and wherein the second queue monitors the first queue for volume of activity during several given time durations or times of day.

14. The method according to claim 9, wherein the flexible tasks are separately stored while the intensive tasks are being processed by the processing module.

15. The method according to claim 9, wherein when a probability of completion of the flexible tasks is greater than the predetermined time period of completion in a given time period, at least one of the flexible tasks are rejected.

16. The method according to claim 9, wherein when the intensive tasks is below a threshold volume of activity level, the flexible tasks are commenced for processing by the processing module.

17. A non-transient computer-readable medium storing a series of programmable instructions configured for execution by at least one processor for enabling automated task preemption, the method comprising:
operatively associating a plurality of multifunctional devices with at least one controller, each one of the plurality of multifunctional devices having a plurality of functional capabilities; and performing processing via a processing module configured to:
(i) separate tasks requiring the plurality of functional capabilities of the plurality of multifunctional devices into intensive tasks requiring a first category of capabilities requiring a resource and having a first loss tolerance and flexible tasks requiring a second category of capabilities having a second loss tolerance greater than the first loss tolerance and being able to relinquish a resource, where the intensive tasks have a higher processing priority than the flexible tasks; and (ii) selectively process the intensive tasks before the flexible tasks regardless of arrival times of the tasks requiring the plurality of capabilities to the at least one controller by creating a first queue and a second queue each being separately processed by the processing module, monitoring by the second queue the first queue for volume of activity during several time durations or times of day, commencing the flexible tasks for processing in response to the volume of activity being below a threshold volume, and rescheduling the flexible tasks that are preempted by the intensive tasks in response to the volume of activity meeting the threshold volume, the rescheduling to be completed within a predetermined time period of completion.

18. The computer-readable medium according to claim 17, wherein the intensive tasks includes core multifunctional device capabilities which include user enabled activities created externally by a user; wherein the flexible tasks include grid multifunctional device capabilities, which include grid activities created internally by the plurality of multifunctional devices; and wherein the intensive tasks have stringent quality of service requirements to multifunctional device resources and the flexible tasks have flexible quality of service requirements to the multifunctional device resources.

19. A system comprising: a processor; and a non-transient computer-readable storage medium in communication with said processor, the computer-readable storage medium comprising one or more programming instructions for:

electronically separating a plurality of functional capabilities of a plurality of multifunctional devices into intensive tasks requiring a first category of capabilities having a first loss tolerance and flexible tasks requiring a second category of capabilities having a second loss tolerance greater than the first lost tolerance, wherein the tolerances are based on a system penalty resulting from a relinquished resource, where the intensive tasks have a higher processing priority than the flexible tasks; and electronically selectively processing the intensive tasks before the flexible tasks regardless of arrival times of the tasks requiring the plurality of capabilities, the processing including:
  creating a first queue and a second queue each being separately processed by the processing module,
  monitoring, by the second queue, the first queue for volume of activity during several time durations or times of day, and,
  one of commencing the flexible tasks for processing in response to the volume of activity being below a threshold volume and rescheduling the flexible tasks that are preempted by the intensive tasks in response to the volume of activity meeting the threshold volume, the rescheduling to be completed within a predetermined probability completion in a given time period.

20. The system according to claim 19, wherein the intensive tasks includes core multifunctional device capabilities; and wherein the flexible tasks includes grid multifunctional device capabilities for parallel processing.

21. The system according to claim 20, wherein the core multifunctional device capabilities include user enabled activities created externally by a user; and wherein the grid multifunctional device capabilities include grid activities created internally by the plurality of multifunctional devices.

22. The system according to claim 19, wherein the intensive tasks have stringent quality of service requirements to multifunctional device resources; and wherein the flexible tasks have flexible quality of service requirements to the multifunctional device resources.

23. The system according to claim 19, wherein the flexible tasks are separately stored while the intensive tasks are being processed by the processing module.

24. The system according to claim 19, wherein when a probability of completion of the flexible tasks is greater than the predetermined time period of probability in a given time period, one or more of the flexible tasks are rejected.

25. The system according to claim 19, wherein the tasks requiring second category of capabilities is processed based on time-of-day activity schemes to ensure all tasks associated with the multifunctional devices are addressed within the predetermined time period of completion in a given time period.

* * * * *